United States Patent [19]

Rathbun

[11] 4,173,027
[45] Oct. 30, 1979

[54] WRITE PRECOMPENSATION SYSTEM

[75] Inventor: Donald J. Rathbun, Andover, Mass.

[73] Assignee: Honeywell Information Systems Inc., Waltham, Mass.

[21] Appl. No.: 862,258

[22] Filed: Dec. 20, 1977

[51] Int. Cl.$^2$ .............................................. G11B 5/09
[52] U.S. Cl. ...................................... 360/45; 364/900
[58] Field of Search ... 364/200 MS File, 900 MS File; 360/45; 340/146.1 F

[56] References Cited

U.S. PATENT DOCUMENTS

| | | | |
|---|---|---|---|
| 3,067,422 | 12/1962 | Hunt | 360/45 |
| 3,879,342 | 4/1975 | Patel | 360/45 |
| 3,911,485 | 10/1975 | McGrath | 360/45 |
| 4,009,490 | 2/1977 | Fassbender | 360/45 |

*Primary Examiner*—James D. Thomas
*Attorney, Agent, or Firm*—Gerald E. Lester; Nicholas Prasinos; Ronald T. Reiling

[57] ABSTRACT

A logic system is provided for precompensating data and clock bits of a formatted binary information stream during a modified frequency modulation (MFM) encoding for recording on a magnetic medium. The binary information stream is formatted into a gap field, an address preamble field, an address mark field and a data field. Clock bit generation is inhibited during the gap and address preamble fields. Further, a second of three clock bits occurring during the high order half-byte of the address mark field is suppressed to provide a modified MFM (M$^2$FM) field. An address mark is provided thereby for indicating the near proximity of a data field. Beginning with the low order half-byte of the address mark field, both MFM clock precompensation and MFM data precompensation is applied as required. The amount of peak shift occurring in the MFM encoded information stream after precompensation is substantially reduced.

8 Claims, 7 Drawing Figures

WRITE PRECOMPENSATION SYSTEM

FIELD OF THE INVENTION

This invention relates to data encoding systems for converting an information bit stream to a format suitable for recording on a magnetic medium, and more particularly to a system for substantially reducing the occurrence of peak shifts in a modified frequency modulated (MFM) encoded information bit stream.

PRIOR ART

The need for higher density recording of digital information on a magnetic medium has fostered the development of numerous encoding schemes including both phase and frequency encoding. With increased data processing speeds placing greater emphasis on high density magnetic recording, resort has been had to frequency modulated (FM) and modified frequency modulated (MFM) binary information streams. The FM and MFM information streams are generally referred to as single density and double density encoded information, respectively.

FM or single density encoding is disclosed in U.S. Pat. No. 4,034,348 to Rathbun. Further, MFM or double density encoding has been disclosed in a Control Data Corporation project note entitled "MFM Double Density FDD System", and dated Nov. 16, 1976. Also disclosed therein is the occurrence of an illegal missing clock in the address mark field which serves as an address mark.

During the generation of FM and MFM encoded information, severe peak shifts may occur in the clock and data bits as a result of magnetic crowding, mechanical jitter and various electrical effects. The peak shift problem may be further aggravated during read recovery. Where the magnitude of the peak shift may be predicted, the encoded data may be precompensated prior to a recording.

The FM and MFM precompensation systems in general have been comprised of frequency sensitive devices such as delay lines, arrays of monostable multivibrators wherein the data stream is rearranged by moving the data bits into one or more flip-flops at a time, or multiphase clock sources.

The delay lines have exhibited a limited accuracy which is unacceptable in contemporary data processing systems, and are not compatible with integrated circuit implementation. Further, the arrays of monostable multivibrators and multiphase clock sources add unneeded complexity to the encoding system, and thereby increase the likelihood of mechanical jitter and electrical effects which cause peak shifts in the data stream.

The present invention is directed to a system for precompensating MFM encoded information without the use of delay lines, flip-flop arrays or multiphase clocks. The amount of peak shift occurring during both a recording operation and a reading operation is substantially reduced, and the compatability of the encoding system with integrated circuit implementation is not degraded.

SUMMARY OF THE INVENTION

A write precompensation logic system is provided for substantially reducing the amount of peak shift in a modified frequency modulated (MFM) encoded binary information stream. More particularly, a formatted binary information stream is sensed a byte at a time to detect the occurrence of an address mark field. Clock bits occurring in the gap and address preamble fields preceding the address mark field are suppressed. Further, the central of three clock bits occurring in the high order half-byte of the address mark field is suppressed to provide an address mark for signalling the near proximity of a data field. A modified modified frequency modulation ($M^2FM$) encoded address mark field is generated thereby, wherein clock bits occur only in every other information bit cell.

The data field of the formatted information stream is sensed a byte at a time, and clock bits are added only to those information bit cells having logic zero data and occurring immediately after an information bit cell also having logic zero data. If the information bit cell preceding the two logic zero data cells has a data bit, the clock bit is delayed an eighth bit cell. If the information bit cell following the two logic zero data cells has a data bit, however, the clock bit is shifted forward an eighth bit cell.

When a data bit occurs in an information bit cell, the data bit is delayed an eighth bit cell if a data bit appears in the immediately following information bit cell and logic zero data appears in the immediately preceding information bit cell. The data bit is shifted forward an eighth bit cell, however, if a data bit occurs in the immediately preceding information bit cell and logic zero data appears in the immediately following information bit cell.

The formated binary information stream thereby is MFM encoded, and each clock and data bit occurring therein is precompensated in accordance with the above stated rules.

In one aspect of the invention, the requirement for precompensation in an information bit cell is predicted before an MFM encoding occurs.

In a further aspect of the invention, one-eighth bit cell elements of each half cell of an information bit cell are provided in parallel to accommodate both data bit and clock bit precompensation.

DESCRIPTION OF THE DRAWINGS

For a more complete understanding of the present invention and for further objects and advantages thereof, reference may now be had to the following description taken in conjunction with the accompanying drawings in which.

DESCRIPTION OF PREFERRED EMBODIMENTS

FIG. 1

Figure 1:
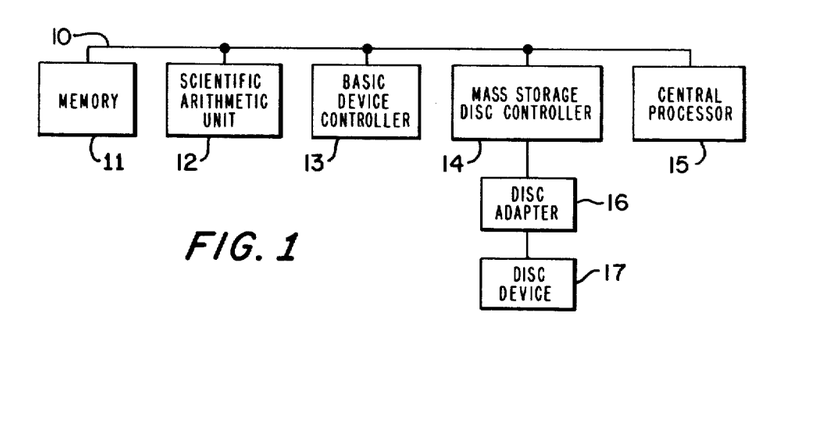
FIG. 1 is a functional block diagram of a data processing system embodying the invention.

FIG. 1 illustrates in functional block diagram form a data processing system embodying the invention.

The data processing system includes a plurality of units coupled to a common bus 10 for the transfer of information during asynchronously generated information bus transfer cycles. The asynchronous design of the bus enables units of various speeds to operate efficiently in the same system. Communications including memory transfers, interrupts, data transfers, status and command transfers are permitted.

More particularly, common bus 10 permits any two units to communicate at a given time over a common signal path. Any unit having a communication requirement requests a bus cycle. When the bus cycle is granted, the requesting unit becomes the master and may address any other unit in the system as its slave. Most transfers are in the direction of master to slave. Some types of bus interchanges, however, require a response cycle wherein the requesting unit indicates that a response is required. The requesting unit identifies itself to the slave, and when the required information becomes available, the slave assumes the role of the master and initiates a transfer to the requesting unit. An interchange between the two units thereby is accomplished within two bus cycles. Intervening time on the bus between the two cycles may be used for other system traffic not involving the two units.

In a typical system, a multi-line common bus 10 is coupled to a memory unit 11, a scientific arithmetic unit 12, a basic device controller 13 for controlling unit record peripheral devices, a mass storage disc controller 14 and a central processor 15. The controller 14 is a microprogramming processor which executes instructions contained in a channel program to control the operation of a disc adapter 16. The disc adapter mediates between the controller 14 and the disc device 17 upon which data is to be written or from which data is to be read.

Priority is granted on the basis of physical position on the bus, with the highest priority being given to the memory unit 11 and the lowest priority being given to the central processor 15. The remaining control units are positioned on the basis of their performance requirements. A channel number is assigned to each of the devices with the exception of the memory unit 11 which is identified by memory address. Full duplex devices as well as half-duplex devices utilize two channel numbers. Those devices having input only or output only operations use one channel number each.

As previously discussed, the master may address any other device on the bus as a slave. The master places the slave channel number on the address lines of the bus 10. Each unit compares the number with its own internally stored channel number, and upon detecting an equivalence becomes the slave and responds to the bus cycle. If the master requires a return response cycle as would occur in a read operation, the master provides its own channel number to the slave.

FIG. 2

Figure 2:
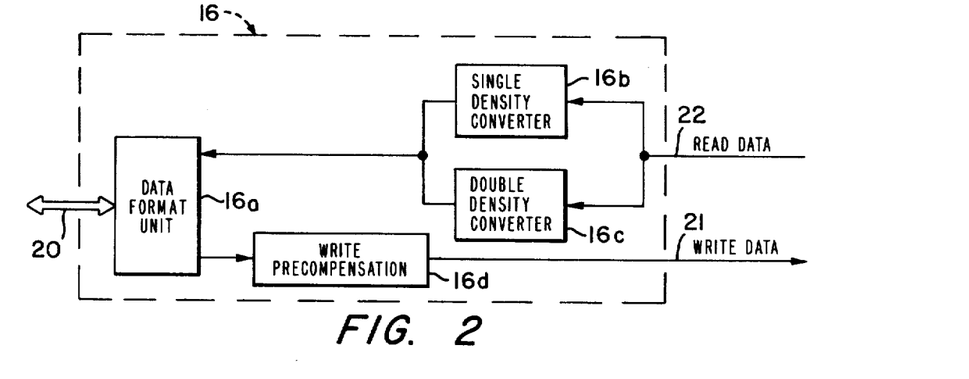
FIG. 2 is a functional block diagram of the disc adapter of FIG. 1.

The invention disclosed herein is embodied in the disc adapter 16. FIG. 2 illustrates the disc adapter in a more detailed functional block diagram form.

The adapter is comprised of a data format unit 16a, a single density converter 16b, a double density converter 16c and a write precompensation unit 16d.

A binary information stream is received serially from the controller 14 on data line 20, and formatted by the data format unit 16a for recording on a disc unit. The write precompensation unit 16d either FM (frequency modulation) or MFM (modified frequency modulation) encodes the formatted information stream, and reduces the magnitude of peak shifts caused by clock and data pulse interactions. The precompensated MFM information stream is forwarded to the disc device 17 by way of a data line 21.

When data is to be read from the disc device, the data is received serially on a data line 22 and applied either to the single density converter 16b or to the double density converter 16c. The selected converter decodes the MFM disc data, and the decoded data is forwarded to the data format unit 16a. The format unit produces a clock signal from the decoded data at twice the data rate, and stabilizes the clock signal to track the recovered data over its inherent time variations. The encoded disc data thereby is converted to NRZ data for transfer to the common bus 10.

FIG. 3

Figure 3:
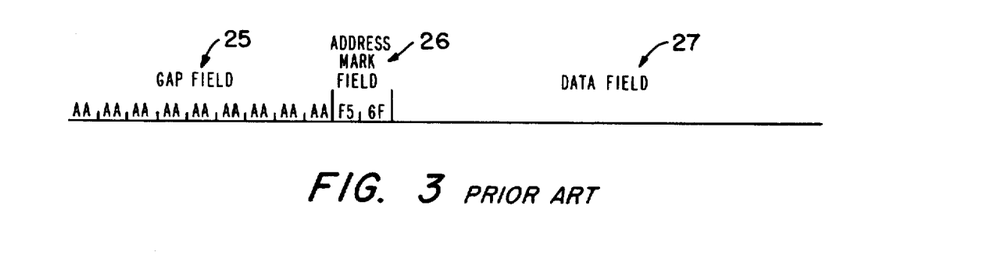
FIG. 3 is a diagram of a frequency modulated binary information stream.

FIG. 3 illustrates graphically frequency modulated (FM) binary information stream to be written on a disc device, and thereafter sampled and recovered during a read operation. Each information bit cell is four microseconds in width, and is comprised of both a two-microsecond clock half-cell and a two-microsecond data half-cell.

The information stream format includes a gap field 25, and an adjacent address mark field 26 contiguous to a data field 27. The gap field is of sufficient length to provide system synchronization, and the address mark field and data field may be of any length.

An address mark occurring within the address mark field 26 signals the near proximity of a data record in the data field 27. More particularly, the address mark field is identified by a leading four consecutive binary one bits followed by three consecutive logic zero clocks. A clock bit is always present in both the gap and data field information bit cells. In the address mark field, however, three consecutive logic zero clocks are inserted for the purpose of providing an address mark signalling the occurrence of the data field.

FIG. 4

Figure 4:
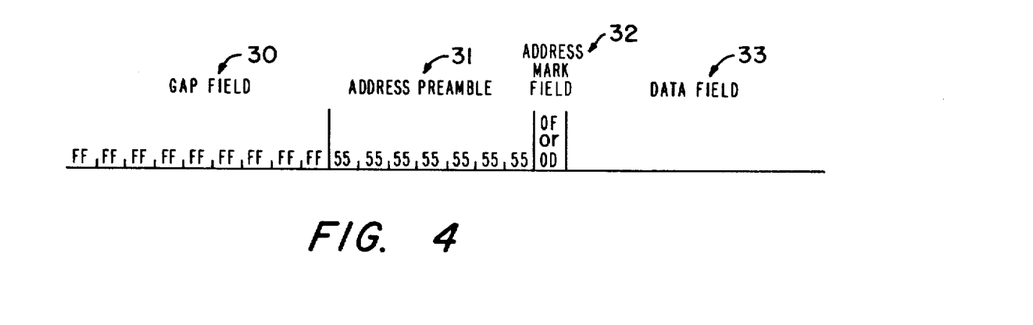
FIG. 4 is a diagram of a formatted binary information stream prepared for an MFM encoding.

FIG. 4 graphically illustrates a binary information stream which has been formatted for a double density or modified frequency modulation (MFM) encoding.

The information stream of FIG. 4 is characterized by two-microsecond wide information bit cells, each comprised of a one-microsecond clock bit half-cell and a one-microsecond data bit half-cell. The information bit stream further is formatted into a gap field 30, an address preamble field 31, an address mark field 32 and a data field 33. The gap field and the address preamble field are comprised entirely of data bits, and are void of clock bits.

The address mark field 32 following the address preamble field 31 is comprised of either a hexidecimal OD or a hexidecimal OF data bit pattern. In accordance with the normal rules for MFM encoding, no clock bit is included within an information bit cell having a data bit and following an information bit cell having a data bit. A clock bit also is excluded if an information bit cell having logic zero data follows an information bit cell having a data bit. If a first information bit cell having logic zero data follows an information bit cell having logic zero data, however, a clock bit is included in the clock half-cell of the first information bit cell.

In the address mark field of the binary information stream of FIG. 4, the clock bit which normally would appear in the third bit cell of the high order half-byte of the address mark field is suppressed to signal the imminent occurrence of a data field.

An M²FM address mark field is generated thereby wherein clock bits do not occur in consecutive bit cells. Rather, clock bits only in every other bit cell.

After the data field following the address mark field illustrated in FIG. 4 has been MFM encoded, no clock bits occur in bit cells having a data bit. In those information bit cells not having data bits, a clock bit is included if the previous information bit cell had logic zero data but excluded if the previous information bit cell had a data bit.

FIG. 5

Figure 5:
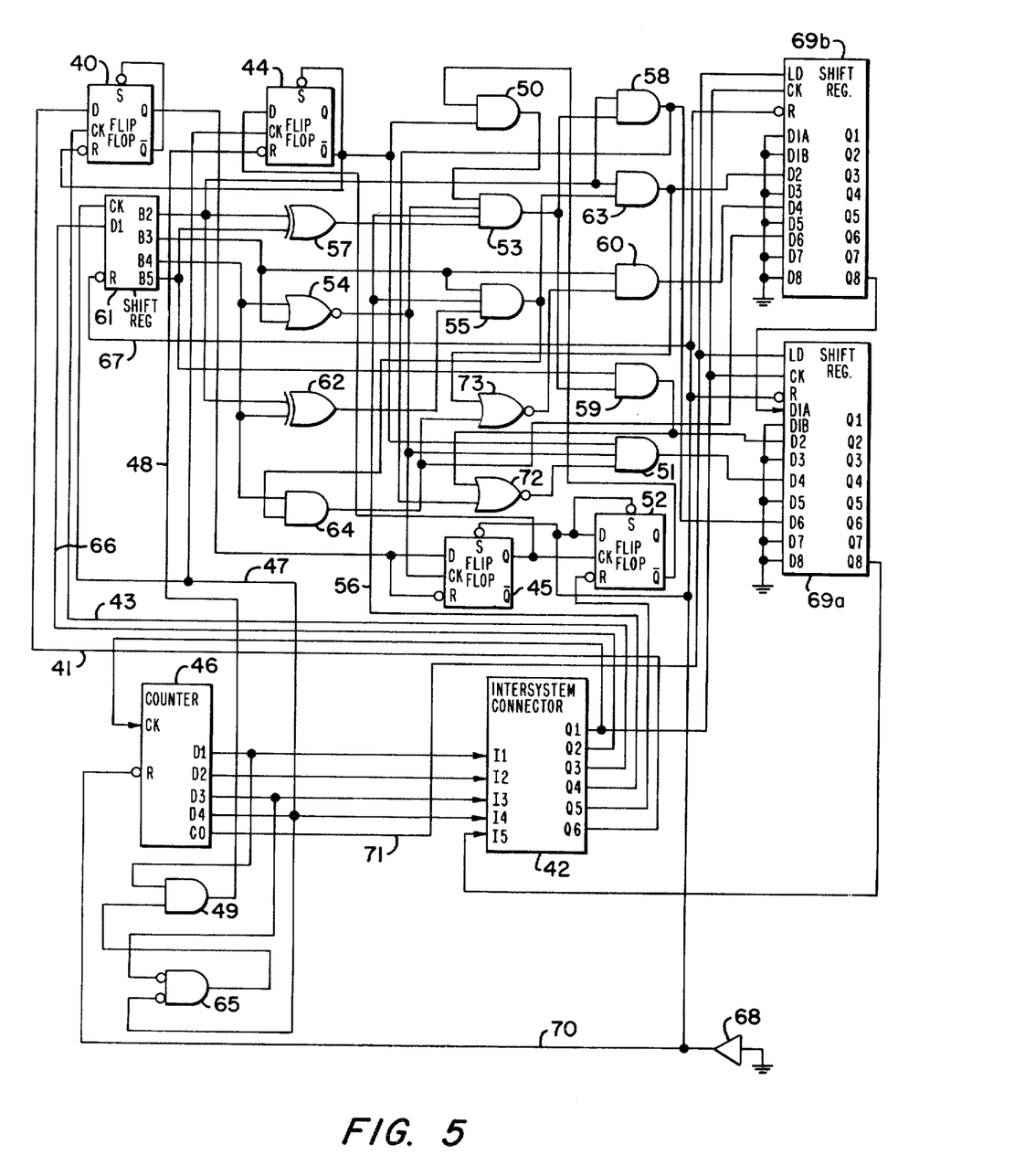
FIG. 5 is a detailed electrical schematic of a logic system embodying the invention.

FIG. 5 illustrates in detailed logic schematic diagram form the write precompensation unit 16d of FIG. 2.

In referring to the electrical schematic illustrated in FIG. 5, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

A D-type flip-flop 40 receives a strobe by way of a control line 41 leading to the Q6 output of an intersystem connector 42. The intersystem connector links the data paths between the disc unit upon which data is to be written and the data format unit 16a of disc adapter 16.

The Q̄ output of the flip-flop 40 is connected to its set input, and the clock input to the flip-flop is connected to the Q3 output of connector 42 by way of a control line 43. The reset input to the flip-flop is connected to the Q̄ output of a D-type flip-flop 44. The Q output of flip-flop 40 is applied to the D and reset inputs of a D-type flip-flop 45.

The clock input to the flip-flop 44 is supplied by the D4 output of a four-bit free-running counter 46 on a control line 47. The reset input to flip-flop 44 is connected by way of a control line 48 to the output of an AND gate 49. The Q̄ output of flip-flop 44 also is connected to the set input of the flip-flop, and the D input to the flip-flop is connected to the Q output of the flip-flop 45. The Q output of flip-flop 44 further is connected to an input of an AND gate 50 and to an input of an AND gate 51.

A second input to gate 50 is connected to the Q̄ output of a D-type flip-flop 52, the clock input of which is connected to the Q output of flip-flop 45. The output of gate 50 is connected to an input of an AND gate 53. A second input to gate 53 is connected to the output of a NOR gate 54, to a second input of gate 51 and to the clock input of flip-flop 45. A third input to gate 53 is connected to an input of an AND gate 55, and connected by way of a control line 56 to the Q4 output of connector 42. A fourth input to gate 53 is connected to the output of an EXCLUSIVE OR gate 57, and the output of gate 53 is connected to an input of an AND gate 58 and to an input of an AND gate 59.

A second input to gate 55 is connected to an input of an AND gate 60, to one input of gate 54 and to the bit 3 (B3) output of an eight bit serial-in-parallel-out (SIPO) register 61 having outputs B0–B7. A third input to gate 55 is connected to the output of an EXCLUSIVE OR gate 62, and the output of gate 55 is connected to an input of an AND gate 63 and to one input of an AND gate 64.

Referring to gate 57 at the output of shift register 61, a first input to the gate is connected to the bit 5 (B5) output of shift register 61 and to a second input of gate 59. A second input to gate 57 is connected to the bit 2 (B2) output of shift register 61, the second input of gate 63, to a second input of gate 58, and to an input of gate 62.

The bit 4 (B4) output of the shift register 61 is connected to a second input of gate 54, to a second input of gate 62 and to a second input to gate 64. The clock input to the shift register is connected by way of control line 47 to the D4 output of counter 46, to an input of NAND gate 65, and to the I4 input of connector 42. The D1 input to shift register 61 is connected by way of a control line 66 to the Q2 output of connector 42. The reset input to shift register 61 is connected by way of a control line 67 to the output of an inverter 68 having a grounded input.

Referring to the counter 46, the clock input of the counter is connected to the Q1 output of connector 42, to the clock input of an eight bit parallel-in-serial-out (PISO) shift register 69a, and to the clock input of an eight bit PISO shift register 69b. The reset input to counter 46 is connected by way of a control line 70 to the set input of flip-flops 45 and 52, to the D input of flip-flop 52, to the reset inputs of shift registers 69a and 69b, and to the output of inverter 68. The D1 output of counter 46 is applied to one input of gate 49 and to the I1 input of connector 42. The D2 output of counter 46 is applied to the I2 input of connector 42, and the D3 output of the counter is applied to the I3 input of connector 42 and to a second input of gate 65. The output of gate 65 in turn is applied to the second input of gate 49. The carry-out output of counter 46 is applied by way of a control line 71 to the load-shift inputs of shift registers 69a and 69b.

The Q5 of the connector 42 is applied to the reset input of flip-flop 52, and the I5 input to the connector is connected to the Q8 output of shift register 69a. The D1A input to the shift register 69a is connected to the Q8 output of shift register 69b, and the D1B input to shift register 69a is connected to ground. The D2 input to shift register 69a is connected to the output of gate 59 and to an input of a NOR gate 72. The D3, D5, D7 and D8 inputs to shift register 69a are each connected to ground. The D4 input to the shift register 69a is connected to the output of gate 51, a third input of which is connected to the output of gate 72. The D6 input to shift register 69a is connected to the output of gate 58 and to a second input of gate 72.

The D1A, D1B, D3, D5, D7 and D8 inputs to shift register 69b each are connected to ground. The D2 input to the shift register is connected to the output of gate 63, and to an input of a NOR gate 73. The D4 input to shift register 69b is connected to the output of gate 60, a second input of which is connected to the output of gate 73. The D6 input to the shift register is connected to a second input of gate 73 and to the output of gate 64.

In operation, a firmware control unit of the mass storage disc controller 14 of FIG. 1 issues a logic one strobe by way of the Q6 output of connector 42 and line 41 to the D input of flip-flop 40. In addition, the firmware control unit issues a clock signal to the flip-flop by way of the Q3 output of connector 42 and line 43. The strobe and clock signals are issued during the gap field 30 of FIG. 4 to indicate that an address mark field is forthcoming. When the strobe is clocked through the flip-flop 40, the flip-flop is set and the Q output of the flip-flop transitions to a logic one level to disable the reset input to flip-flop 45.

The counter 46 receives a clock signal each 125 nanoseconds from the disc controller 14 by way of the Q1 output of connector 42. In response thereto, a logic one pulse occurs at the D1 output of the counter every 250 nanoseconds, at the D2 output of the counter every 500 nanoseconds, at the D3 output every microsecond, and at the D4 and carry-out (CO) outputs every two microseconds. The output of gate 65 thus transitions to a logic zero every two microseconds to disable the gate 49 and reset the flip-flop 44. The D4 output of the counter further supplies the clock signals to shift register 61 and flip-flop 44. The CO output of the counter controls the loading of shift registers 69a and 69b.

As a formatted binary information stream is received from controller 14 by way of the data format unit 16a, the information appears at the Q2 output of connector 42 and is applied to the D1 input of shift register 61. When the address mark field of the information stream is loaded into the shift register 61, either an OD or an OF hexidecimal data bit pattern will be encountered as illustrated by FIG. 4. When the B3 and B4 outputs of the shift register 61 are at a logic zero level, the presence of two successive logic zeros in the information stream is indicated. The output of NOR gate 54 thereupon transitions to a logic one level to trigger the flip-flop 45, thereby indicating when a first clock bit requirement in the address mark field is detected.

As before described in connection with the description of FIG. 4, the address mark field is comprised of a hexidecimal OD or a hexidecimal OF. In either case, the hexidecimal digit 0 shall cause the generation of three clock bits during the MFM encoding of the information bit stream. The application of the three clock bits to the precompensation logic of FIG. 5 ordinarily would cause the first and third clock bits to be shifted. The generation of an address mark by suppressing the central of the three clock bits, however, obviates the requirement for precompensating the first and last clock bits.

More particularly, the flip-flop 52 is triggered by flip-flop 45 when the output of NOR gate 54 detects a first clock bit requirement in the address mark field. The $\overline{Q}$ output of flip-flop 52 thereupon transitions to a logic zero to disable gate 50, and to inhibit the precompensation of a first of three clock bits. Flip-flop 52 remains set until data is to be written on the disc device 17. MFM clock precompensation thus is inhibited until after the hexidecimal 0 digit of the address mark field has been applied through the precompensation logic.

Upon the occurrence of the leading edge of a next two-microsecond clock pulse supplied by the D4 output of counter 46, the flip-flop 44 is triggered to transition the $\overline{Q}$ output of the flip-flop to a logic zero level. In response thereto, the flip-flop 44 is set and the flip-flops 40 and 45 are reset. Further, the gates 50 and 51 are disabled to not only inhibit clock bit precompensation, but also prevent the generation of a clock bit. The suppression of the central of the three clock bits provides an indicator for signalling the near proximity of a data field.

When the clock bit normally occurring in the third information bit cell of the high order half-byte of the address mark field is suppressed as above described, an $M^2FM$ field is generated wherein clock bits can occur only in every other bit cell. The $M^2FM$ field serves to signal the beginning of the data field, and to prevent the generation of data errors which otherwise would occur from the precompensation of information bits in the gap and address mark fields.

After the high order half-byte of the address mark field has been received at shift register 61, the flip-flop 52 is reset by the disc controller 14 to free the gate 50 for clock bit precompensation. The data field of the information bit stream is shifted serially into the shift register 61 from the Q2 output of connector 42, and clock bits are added to those information bit cells having logic zero data and occurring after an information bit cell also having logic zero data. Otherwise, the clock bits are excluded from the information bit cells. More particularly, the B2 and B5 outputs of the shift register are sensed. When the B2 and B5 outputs differ, the output of gate 57 transitions to a logic one level which is applied to gate 53. If the disc write head is positioned over the inner cylinders of the disc surface as indicated by a logic one on line 56, and the B3 and B4 outputs of shift register 61 are each at a logic zero level, the output of gate 53 transitions to a logic one level to indicate that an MFM clock compensation may occur. If the B2 output is at a logic one level, the output of AND gate 58 transitions to a logic one level and an early clock bit compensation is effected by providing a logic one to the D6 input of shift register 69a. If the B5 output of shift register 61 is at a logic one level, however, the output of AND gate 59 transitions to a logic one level to provide a late clock compensation. More particularly, a logic one is applied to the D2 input of shift register 69a. If the outputs of neither gate 58 nor gate 59 are at a logic one level, the output of gate 72 transitions to a logic one level to indicate that neither an early nor a late clock compensation shall occur. The gate 51 thereupon may be enabled to supply a normal or compensation free clock bit to the D4 input of shift register 69a.

When the B2 and B4 outputs of shift register 61 differ, the output of gate 62 transitions to a logic one level. If the line 56 is at a logic one level to signal the presence of a low current mode, and the B3 output of shift register 61 is at a logic one level, the output of gate 55 transitions to a logic one level to indicate that an MFM data compensation may occur. If late data bit compensation is to be provided, the B4 output of shift register 61 must be at a logic zero level, and the B2 output of the shift register must be at a logic one level to transition the output of gate 63 to a logic one level. A late compensated data bit thereupon is supplied to the D2 input of shift register 69b. If an early data bit compensation is to be supplied, the B2 output of shift register 61 must be at a logic zero level, and the B4 output of the shift register must be at a logic one level to transition the output of gate 64 to a logic one level. In response thereto, an early compensated data bit is supplied to the D6 input of shift register 69b. If neither gate 63 nor gate 64 are at a logic one level, however, the requirement for a normal or compensation free data bit is indicated. In that event, the output of gate 73 transitions to a logic one level to enable gate 60, and a logic one level is supplied to the D4 input of shift register 69b.

It is to be understood that shift registers 69a and 69b form a 16 bit shift register with the Q8 output of shift register 69b supplying data to the D1A input of shift register 69a. The registers are loaded every two microseconds, and shifted every 125 nanoseconds. Thus, the combined 16 bit register receives 16 shift commands each two microseconds. Either normal or compensated data bits are supplied to shift register 69b, and either normal or compensated clock bits are supplied to shift register 69a. It is thus apparent that shift registers 69a and 69b each provide one-eighth cell elements of a half information bit cell in parallel. This information bit cell snapshot feature is one of the novel aspects of the invention particularly conducive to precompensation prediction.

The write precompensated data occurs at the Q8 output of shift register 69a, and is applied to the I5 input of connector 42 leading to the disc device 17.

FIGURE 6

Figure 6:
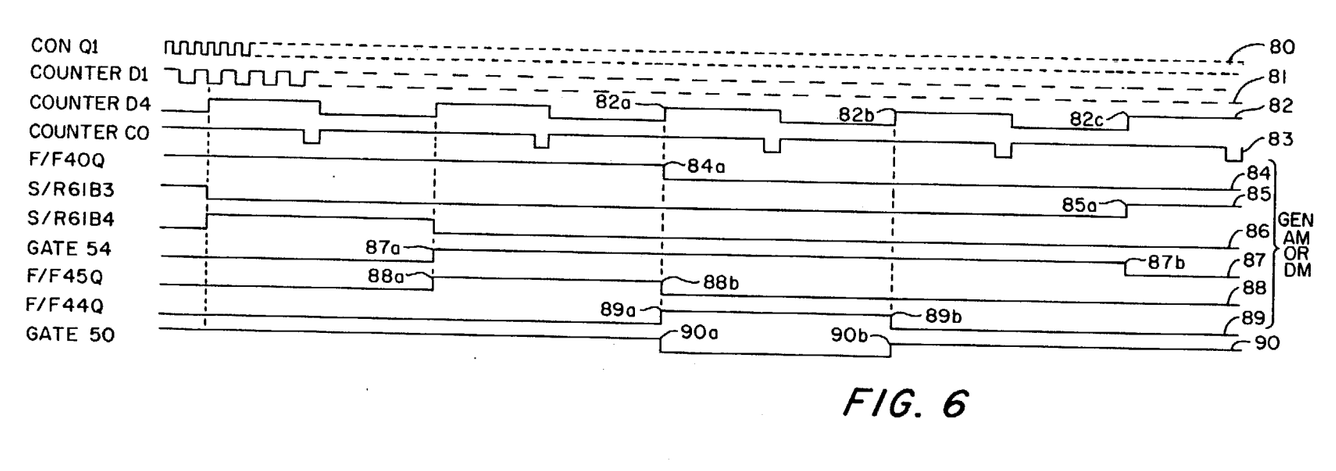
FIG. 6 is a timing diagram of the operation of the logic system of FIG. 5 during the generation of an $M^2FM$ address mark field.

FIG. 6 illustrates in graphic form the operation of the logic system of FIG. 5 during the generation of an M²FM encoded address mark field.

Waveform 80 illustrates the 125 nanosecond clock signal supplied by the Q1 output of connector 42 to the clock inputs of the counter 46 and the shift registers 69a and 69b. Waveform 81 illustrates the 250 nanosecond clock signal appearing at the D1 output of counter 46, and waveform 82 illustrates the two microsecond clock signal appearing at the D4 output of counter 46. Waveform 83 illustrates the carry-out output of counter 46, and waveform 84 illustrates the Q output of flip-flop 40. Waveform 85 illustrates the B3 output of shift register 61, and waveform 86 illustrates the B4 output of the shift register. Waveform 87 illustrates the output of NOR gate 54, waveform 88 illustrates the Q output of flip-flop 45, and waveform 89 illustrates the Q output of flip-flop 44. Waveform 90 illustrates the output of gate 50.

In operation, the counter 46 receives the waveform 80 at its clock input, and provides waveform 81 at its D1 output, waveform 82 at its D4 output and waveform 83 at its CO output.

An information bit pattern is applied serially to the D1 input of shift register 61, which is loaded and shifted each two microseconds. During the period that the B3 output of shift register 61 as illustrated by waveform 85 differs from the B4 output of the register as illustrated by waveform 86, the output of NOR gate 54 remains at a logic zero level as illustrated by waveform 87. When the B3 and B4 outputs of the shift register are each at a logic zero level, however, the output of gate 54 transitions to a logic one level as indicated at 87a. In addition, the flip-flop 45 is triggered in response to gate 54 as illustrated by waveform 88 at 88a.

Upon the occurrence of the leading edge of a next two microsecond pulse as illustrated at 82a by waveform 82, the flip-flop 44 is triggered to transition the Q output of the flip-flop to a logic one level as illustrated at 89a by waveform 89. The $\overline{Q}$ output of the flip-flop accordingly transitions to a logic zero level to reset flip-flop 40 as indicated at 84a of waveform 84, and to reset flip-flop 45 as indicated at 88b of waveform 88. The $\overline{Q}$ output of flip-flop 44 also disables gate 51 and gate 50 as indicated at 91a of Waveform 91. Clock bit precompensation thereby is inhibited, and the generation of a clock bit is suppressed to provide an M²FM encoded address mark field having an address mark for indicating the occurrence of a data field.

Upon the generation of a next clock pulse at the D4 output of counter 46 as indicated at 82b, gate 49 is disabled to reset flip-flop 44 as indicated at 89b. In response thereto, gate 50 is enabled as indicated at 90b to accommodate clock precompensation.

The B3 output of shift register 61 transitions to a logic one level at 85a upon the next occurrence of a two microsecond pulse at 82c. The output of NOR gate 54 thus transitions to a logic zero at 87b to inhibit MFM clock bit generation. As before stated, MFM clock bit generation is blocked in a data field unless an information bit cell having logic zero data follows an information bit cell having logic zero data.

FIGURE 7

Figure 7:
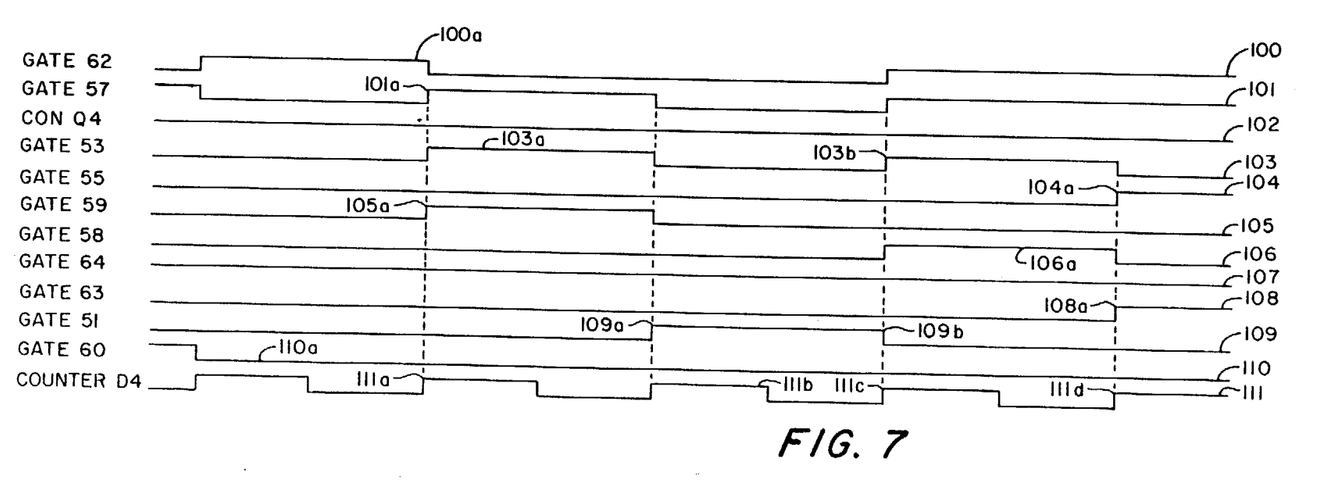
FIG. 7 is a timing diagram of the operation of the logic system of FIG. 5 during the conversion of an NRZ information stream into MFM encoded data.

FIG. 7 illustrates graphically the operation of the logic system of FIG. 5 during the MFM encoding of a data field.

Waveform 100 illustrates the output of EXCLUSIVE OR gate 62, and waveform 101 illustrates the output of EXCLUSIVE OR gate 57. Waveform 102 illustrates the Q4 output of connector 42, and waveform 103 illustrates the output of gate 53. Waveform 104 illustrates the output of gate 55, waveform 105 illustrates the output of gate 59, waveform 106 illustrates the output of gate 58, and waveform 107 illustrates the output of gate 64. The waveform 108 illustrates the output of gate 63, the waveform 109 illustrates the output of gate 51 and waveform 110 illustrates the output of gate 60. Waveform 111 illustrates the 0.50 MHz clock signal appearing at the D4 output of counter 46.

As before described, when the disc write head is positioned at the inner cylinders of the disc surface, the write head is placed in a low current mode as indicated by the logic one level of waveform 102. It is during the low current mode that a data compensation operation occurs.

During the data compensation operation, the outputs of gates 57 and 62 are continually sensed. Waveform 100 is at logic one level when the B2 and B4 outputs of shift register 61 differ, and waveform 101 is at a logic one level when the B2 and B5 outputs of shift register 61 differ. Waveform 100 controls the duty cycle of gate 55, and waveform 101 controls the duty cycle of gate 53. Gate 55 in turn enables or disables the late data and early data gates 63 and 64, respectively. Gate 53 enables or disables the early clock gate 58 and the late clock gate 59. Thus, when the B2 and B4 outputs of shift register 61 differ as illustrated by pulse 100a of waveform 100, a data compensation may occur when the output of gate 55 transitions to a logic one level as illustrated by waveform 104. Since the output of gate 55 is not at a logic one level during the time period of pulse 100a, however, no data recompensation can occur. Further, since the output of gate 60 as illustrated by waveform 110 and 110a also is at a logic zero level, only logic zero data is supplied to the MFM data stream during pulse 100a.

Upon the occurrence of a next two microsecond clock pulse at the D4 output of counter 46 as indicated at 111a of waveform 111, the gate 57 transitions to a logic one level at 101a of waveform 101 to indicate that B2 and B5 outputs of shift register 61 differ. The gate 53 is enabled in response thereto as indicated at 103a of waveform 103 to accommodate an MFM clock bit precompensation.

If the B2 output of shift register 61 were at a logic zero level and the B5 output of the shift register were at a logic one level, the output of gate 59 would transition to a logic one level as indicated at 105a of waveform 105 to provide a late clock bit precompensation.

Upon the occurrence of the leading edge of the clock pulse 111b of waveform 111, both of the gates 57 and 62 are disabled. Gates 53 and 55 thus are disabled, and either clock nor data precompensation may occur. Further, if the B3 output of shift register 61 were at a logic zero level during a time period that the output of gate 54 were at a logic one level, the output of gate 51 would be a logic one level as indicated at 109a of waveform 109 while the output of gate 60 would be at a logic zero level. A compensation free clock bit thus is supplied to the MFM information stream.

The outputs of both gates 57 and 62 transition to a logic one level concurrent with the leading edge of clock pulse 111c. Further, the ouput of gate 53 transitions to a logic one level at 103b to accommodate a clock bit precompensation. Since the output of gate 59 is at a logic zero level as indicated by waveform 105 during a time that the output of gate 58 is at a logic one level as indicated by waveportion 106a, an early clock precompensation occurs. A compensation free clock bit cannot be generated, however, since the output of gate 51 is at a logic zero level as indicated at 109b of waveform 109.

Two microseconds later as indicated at 111d, gates 53 and 58 transition to a logic zero level. In addition, gates 55 and 63 transistion to a logic one level as indicated at 104a and 108a, respectively. Thus, no clock precompensation can occur during the next two microseconds, but data precompensation can occur. From an inspection of waveforms 107 and 108, it is seen that a late data precompensation is effected.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A logic system for MFM encoding a formatted binary information stream and precompensating for both clock bit and data bit peak shifts which may occur when an MFM encoded information stream is recorded on and read from a recording medium, which comprises:
   (a) logic distribution means receiving said binary information stream for providing plural information bits of said binary information stream in parallel;
   (b) clock bit logic control means in electrical communication with said distribution means and receiving extra-system control signals for inhibiting clock bit peak shift precompensation in fields other than a data field of said binary information stream, and for indicating the occurrence of bit patterns in said binary information stream into which a clock bit may be inserted to effect an MFM encoding;
   (c) logic gate means responsive to said distribution means, said logic control means and said recording medium for predicting the occurrence of said peak shifts in the event said MFM encoded information stream is recorded on and read from said recording medium; and
   (d) precompensation logic means responsive to said distribution means, said logic control means and said logic gate means for MFM encoding and precompensating said binary information stream for said peak shifts prior to a recording on said recording medium.

2. A logic system for substantially reducing the magnitude of both clock bit and data bit peak shifts occurring during a recording and read recovery of MFM encoded digital information stored on a recording medium, which comprises:
   (a) logic distribution means receiving serially a formatted binary information stream for providing plural information bit cells of said information stream in parallel;
   (b) first logic gate means responsive to said distribution means for signalling the occurrence of bit cell patterns into which a clock bit may be inserted to effect an MFM encoding;
   (c) bistable multivibrator means in electrical communication with said first logic gate means and receiving extra-system control signals for suppressing a selected clock bit in an address mark field of said binary information stream to efect an M²FM encoding of said address mark field to thereby indicate the near proximity of a data field and for inhibiting clock bit peak shift precompensation in other than said data field;
   (d) second logic gate means responsive to said distribution means, said first logic gate means, said bistable multivibrator means and said recording medium for predicting the occurrence of said clock bit and data bit peak shifts in a recording and read recovery of said MFM encoded digital information; and
   (e) information bit cell encoding means in electrical communication with said distribution means, said first logic gate means, said bistable multivibrator means and said second logic gate means for MFM encoding said binary information stream and precompensating for said clock bit and data bit peak shifts prior to a recording on said recording medium.

3. A method of encoding a formatted binary information stream to substantially reduce the magnitude of both clock bit and data bit peak shifts which may occur in a recording and read recovery of said information stream from a storage medium, which comprises:
   (a) sensing plural information bit cells of said information stream to detect bit patterns which may cause the occurrence of peak shifts in a recording or read recovery of said information stream, and to identify information bit cells into which clock bits may be inserted to effect an MFM encoding;
   (b) generating said clock bits for insertion into identified ones of said information bit cells;
   (c) inhibiting clock bit peak shift precompensation of a first and third of said clock bits in an address mark field of said information stream and suppressing the generation of a second of said clock bits to M²FM encode said address mark field; and
   (d) amending the time of occurrence of data and clock bits within those information bit cells appearing within detected ones of said bit patterns in a data field of said information stream to provide an MFM encoded information stream precompensated for said clock bit and data bit peak shifts prior to being recorded on said recording medium.

4. A method of precompensating a formatted binary information stream during an encoding before a recording on a storage medium, thereby substantially reducing the magnitude of both clock bit and data bit peak shift errors which may occur during a read recovery from said storage medium, which comprises:
   (a) sensing plural bit cells of said information stream to detect the occurrence of bit patterns into which clock bits may be inserted in accordance with MFM encoding rules;
   (b) generating said clock bits for insertion into detected ones of said bit patterns;
   (c) precompensating those of said clock bits occurring in bit cells which are either immediately followed by a bit cell having a logic one data bit and immediately preceded by two bit cells having logic zero data bits, or immediately followed by a bit cell having a logic zero data bit and immediately preceded by a bit cell having a logic zero data bit which in turn is immediately preceded by a bit cell having a logic one data bit;
   (d) inhibiting the precompensation of a first clock bit and a third clock bit generated for insertion into a first and a third of said detected ones;
   (e) suppressing the generation of a second clock bit for a second of said detected ones to provide an M²FM encoded address field having an address mark signalling the near proximity of a data field; and
   (f) precompensating those data bits occurring in bit cells which are either immediately followed by a bit cell having a logic one data bit and immediately preceded by a bit cell having a logic zero data bit, or immediately preceded by a bit cell having a logic one data bit and immediately followed by a bit cell having a logic zero data bit.

5. The method set forth in claim 4 wherein said step of precompensating clock bits includes the steps:
   (a) time shifting a clock bit an eighth of a bit cell forward if an associated bit cell is immediately followed by a bit cell having a logic one data bit and immediately preceded by two bit cells having logic zero data bits; and
   (b) delaying a clock bit an eighth of a bit cell if an associated bit cell is immediately followed by a bit cell having a logic zero data bit and immediately preceded by a bit cell having a logic zero data bit which in turn is immediately preceded by a bit cell having a logic one data bit.

6. The method set forth in claim 4 wherein the step of precompensating data bits includes the steps:
   (a) delaying a data bit an eighth of a bit cell if an associated bit cell is immediately preceded by a bit cell having a logic one data bit and immediately followed by a bit cell having a logic zero data bit; and
   (b) shifting a data bit an eighth of a bit cell forward if an associated bit cell is immediately followed by a bit cell having a logic zero data bit and immediately preceded by a bit cell having a logic one data bit.

7. A logic system for applying both clock bit and data bit peak shift precompensation during an MFM encoding of a binary information stream formatted into a gap field, an address preamble field, an address mark field and a data field for recording on a storage medium, which comprises:
   (a) first shift register means receiving said information stream for providing a sensing window overlying plural information bit cells;
   (b) first logic gate means responsive to said first shift register means for identifying those of said plural information bit cells into which clock bits are to be inserted to effect an MFM encoding;
   (c) second logic gate means responsive to said first shift register means, said first logic gate means and an extra-system write head position signal for predicting a peak shift error which may occur during an encoding-recording of a recovery-decoding of said information stream;
   (d) bistable multivibrator means in electrical communication with said first logic gate means and extra-system control signals for inhibiting the clock precompensation of a first and a third of identified ones of said plural information bit cells, and suppressing the generation of a clock bit for a second of said identified ones to M²FM encode said address mark field;
   (e) third logic gate means responsive to said first shift register means, said first logic gate means, and said second logic gate means for generating data and clock bits precompensated for peak shift error;
   (f) second shift register means in electrical communication with said third logic gate means and responsive to extra-system control signals for providing an information bit cell window into which said data and clock bits may be selectively inserted by said third logic gate means to provide an MFM encoded information stream precompensated for both clock bit and data bit peak shift errors which may occur in a recording and read recovery of said MFM encoded information stream from said storage medium; and
   (g) counter means responsive to extra-system control signals for synchronizing the operation of said first shift register means, said bistable multivibrator means and said second shift register means.

8. In a data processing system having a central processor, a memory unit and a mass storage disc controller in electrical communication, and a disc adapter including a data format unit responsive to control signals from said disc controller for transferring data to and from a disc device, the combination which comprises:
   (a) logic distribution means in electrical communication with said disc controller and receiving a formated binary information stream from said data format unit for accommodating the sensing of plural information bit cells;
   (b) first logic gate means responsive to said distribution means for detecting the occurrence of bit patterns into which clock bits may be inserted to effect an MFM encoding;
   (c) bistable multivibrator means in electrical communication with said disc controller and said first logic gate means for suppressing a selected clock bit in an address mark field of said information stream to effect an M²FM encoding of said address mark field;
   (d) second logic gate means responsive to said distribution means, said first logic gate means and said disc device for initiating peak shift precompensation to data and clock bits occurring in those bit patterns of a data field of said information stream having a likelihood of incurring peak shift error; and (e) precompensation logic means in electrical communication with said disc controller, said distribution means, said first logic gate means and said second logic gate means for selectively inserting data and clock bits into information bit cells of said information stream to provide an MFM encoded information stream precompensated for both clock bit and data bit peak shifts which may occur in the event said MFM encoded information stream is recorded on and read from said disc device.

* * * * *